(12) United States Patent
Tsividis

(10) Patent No.: US 6,389,445 B1
(45) Date of Patent: May 14, 2002

(54) METHODS AND SYSTEMS FOR DESIGNING AND MAKING SIGNAL-PROCESSOR CIRCUITS WITH INTERNAL COMPANDING, AND THE RESULTING CIRCUITS

(75) Inventor: Yannis Tsividis, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 09/358,293

(22) Filed: Jul. 21, 1999

Related U.S. Application Data

(63) Continuation-in-part of application No. 08/937,176, filed on Sep. 25, 1997, now abandoned, which is a continuation of application No. 08/521,996, filed on Aug. 31, 1995, now abandoned.

(51) Int. Cl.$^7$ ................................................. G06G 7/02
(52) U.S. Cl. ...................................................... 708/819
(58) Field of Search .......................... 708/819, 822–824

(56) References Cited

U.S. PATENT DOCUMENTS

| | | | | |
|---|---|---|---|---|
| 3,421,141 A | * | 1/1969 | Meyerhoff | 708/819 |
| 3,434,060 A | * | 3/1969 | Painter et al. | 708/819 |
| 3,681,618 A | | 8/1972 | Blackmer | 307/229 |
| 4,430,626 A | | 2/1984 | Adams | 331/108 B |
| 4,547,889 A | * | 10/1985 | Picchi et al. | 708/819 |
| 4,823,299 A | | 4/1989 | Chang et al. | 364/724.013 |
| 5,465,227 A | * | 11/1995 | Durkee et al. | 708/819 |

OTHER PUBLICATIONS

Y. P. Tsividis et al., "Companding in Signal Processing", *Electronics Letters*, vol. 26 (1990), pp. 1331–1332.
F. Callias et al., "A Set of Four IC's in CMOS Technology for a Programmable Hearing Aid", *IEEE Journal of Solid–State Circuits*, vol. 24 (1989), pp. 301–312.
E. Seevinck, "Companding Current–mode Integrator: a New Circuit Principle for Continuous–time Monolithic Filters", *Electronics Letters*, vol. 26 (1990), pp. 2046–2047.

D. R. Frey, "Log–domain Filtering: an Approach to Current–mode Filtering", *IEEE Proceedings–G*, vol. 140 (1993), pp. 406–416.

R. Schaumann et al., *Design of Analog Filters*, Prentice Hall, 1990, pp. 298–299, 582.

G. M. Swisher, *Introduction to Linear Systems Analysis*, Matrix Publishers, 1976, pp. 154–155, 390–391.

E. A. Vittoz, "Low–Power, Low–Voltage Limitations and Prospects in Analog Design". In: R. J. van de Plassche et al. (eds.), *Analog Circuit Design*, Kluwer, Boston 1995, pp. 3–15.

E. Dijkstra et al., "Low–Power Oversampled A/D Converters". In: R. J. van de Plassche et al. (eds.), *Analog Circuit Design*, Kluwer, Boston 1995.

* cited by examiner

*Primary Examiner*—Tan V. Mai
(74) *Attorney, Agent, or Firm*—Baker Botts L.L.P.

(57) ABSTRACT

Electrical filter or signal processor circuits are provided with internal companding for reduced sensitivity to noise while input-output response is as conventionally specified. In the continuous-time case, for a specified circuit described by state equations with a state vector x(t), state equations are derived of an equivalent companding circuit having a state vector w(t)=G(t)x(t), where G(t) is a suitably chosen matrix. G(t) may be chosen for instantaneous or syllabic companding of the state vector. A corresponding technique applies to discrete-time circuits.

10 Claims, 8 Drawing Sheets

METHODS AND SYSTEMS FOR DESIGNING AND MAKING SIGNAL-PROCESSOR CIRCUITS WITH INTERNAL COMPANDING, AND THE RESULTING CIRCUITS

This is a continuation-in-part application of patent application Ser. No. 08/937,176, filed Sep. 25, 1997, now abandoned, which was a continuation application of application Ser. No. 08/521,996, filed Aug. 31, 1995, now abandoned.

BACKGROUND OF THE INVENTION

The invention relates to companding, i.e., the compression and expansion of the dynamic range of electrical signals.

In companding, an input signal is compressed so that the dynamic range of the compressed signal is reduced as compared with that of the input signal. After desired transmission or processing, the dynamic range of the signal is expanded. Noise picked up in transmission or processing then has reduced amplitude.

Companding may be considered as originating in the field of telephone signal transmission. It is also used in acoustical recording and playback, where so-called Dolby systems and the like have found widespread use in high-fidelity reproduction. Such systems can reproduce sound with reduced noise.

Companding is being used in other devices, such as hearing aids, for example, where power consumption must be minimized. Low-power devices are particularly susceptible to noise.

Such concerns also apply generally to today's integrated circuits, which usually must operate with small voltage swings and thus are vulnerable to noise. This is true especially of high-Q filters, in which large internal gains can amplify noise and interference.

The following published items are representative of the state of the art:

1. Y. P. Tsividis et al., "Companding in Signal Processing", *Electronics Letters*, Vol. 26 (1990), pp. 1331–1332;
2. F. Callias et al., "A Set of Four IC's in CMOS Technology for a Programmable Hearing Aid", *IEEE Journal of Solid-State Circuits*, Vol. 24 (1989), pp. 301–312;
3. E. Seevinck, "Companding Current-mode Integrator: a New Circuit Principle for Continuous-time Monolithic Filters", *Electronics Letters*, Vol. 26 (1990), pp. 2046–2047;
4. D. R. Frey, "Log-domain Filtering: an Approach to Current-mode Filtering", *IEEE Proceedings-G*, Vol. 140 (1993), pp. 406–416;
5. E. Dijkstra et al., "Low-Power Oversampled A/D Converters", in Van de Plassche et al. (eds.), *Analog Circuit Design: Low-power Low-voltage, Integrated Filters, and Smart Power*, Kluwer, Boston, 1995.

Among these items, 3., 4. and 5. are concerned with "instantaneous companding", in which companding is effected based on a signal's instantaneous value. By distinction, items 1. and 2. are concerned with "syllabic companding", depending on some measure of a signal's average strength in a suitably chosen time interval.

Of particular present interest in electrical signal processing are filter circuits with companding, and with linear input-output response. Among the above-referenced items, 3. and 4. disclose special cases of such circuits.

Quite generally, for a continuous-time linear, time-invariant filter or signal-processor circuit as described by state equations in the standard form $$\dot{x} = Ax + Bu$$

and $$y = Cx + Du$$

where u(t) is the input vector, y(t) the output vector, x(t) the state vector, and A, B, C and D are matrices of appropriate dimensions, it would be desirable to have a technique for producing a circuit with internal companding and with the same input-output response as the specified circuit.

SUMMARY OF THE INVENTION

In the case of a continuous-time filter or signal processor, such a companding circuit can be realized by implementing, instead of the specified circuit, a circuit described by state equations $$\dot{w} = \hat{A}w + \hat{B}u$$

and $$y = \hat{C}w + Du$$

for a derived state vector w(t)=G(t)x(t) of derived state variables, and for matrices $$\hat{A} = \dot{G}G^{-1} + GAG^{-1}, \hat{B} = GB$$

and $$\hat{C} = CG^{-1}$$

wherein the nonsingular, differentiable matrix G(t) has been determined such that the derived state vector w(t) is companded for reduced noise as compared with the state vector x(t). It can be verified by substitution that the derived new circuit is input-output equivalent to the originally specified, internally linear circuit.

In this description, t denotes time, and a "dot" superposed on a symbol designates taking the derivative with respect to time of the entity denoted by the symbol under the dot. When applied to a vector or a matrix, the derivative is understood component- or element-wise.

In the case of a discrete-time filter or signal processor, described by state equations $$x(n+1) = Ax(n) + Bu(n)$$

and $$y(n) = Cx(n) + Du(n)$$

where integers n and n+1 refer to consecutive instants of discrete time, new circuit matrices are determined by $$\hat{A} = G(n+1)AG^{-1}(n), \hat{B} = G(n+1)B$$

and $$\hat{C} = CG^{-1}(n).$$

It can be verified by substitution that the derived new circuit is input-output equivalent to the originally specified, internally linear circuit.

DETAILED DESCRIPTION OF PREFERRED EMBODIMENTS

Figure 1:
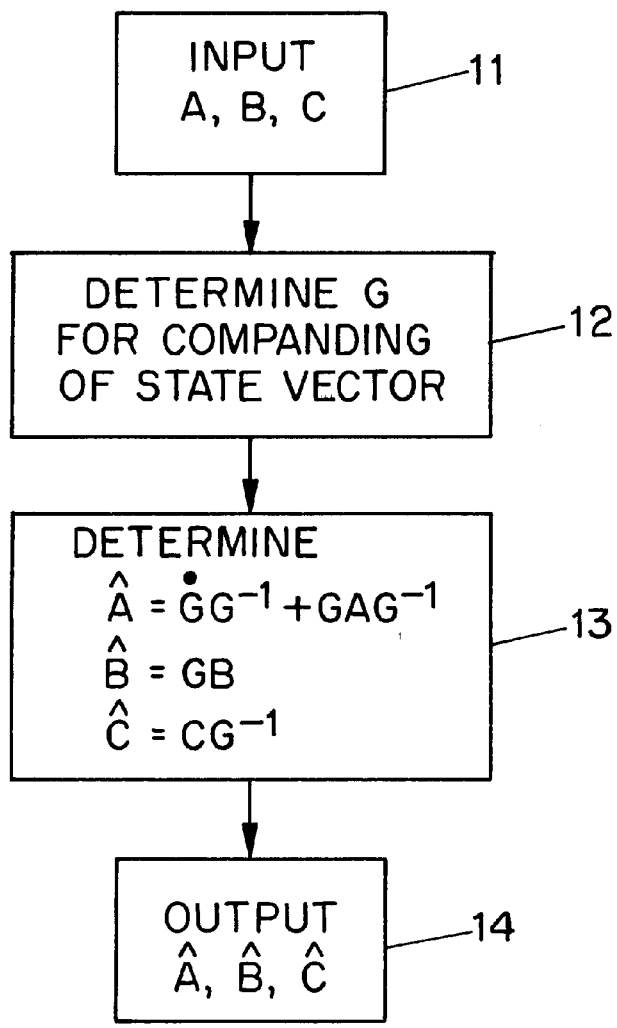
FIG. 1 is a block diagram of a system in accordance with a preferred embodiment of the invention, as may be implemented as a programmed computer, for example.

With reference to the Summary above, FIG. 1 shows input means 11 (e.g., a computer keyboard) for entering the coefficients of the matrices A, B and C representing a filter or signal processor circuit with specified characteristics, means 12 for determining the coefficients of the matrix G (with the goal, e.g., of maintaining the envelope of the internal signals substantially constant), computing means 13 (e.g., a suitably programmed CPU) for determining the elements of the matrices $\hat{A}, \hat{B}$ and $\hat{C}$, and output means 14 (e.g., a printer) for the elements of these determined matrices.

Figure 2:
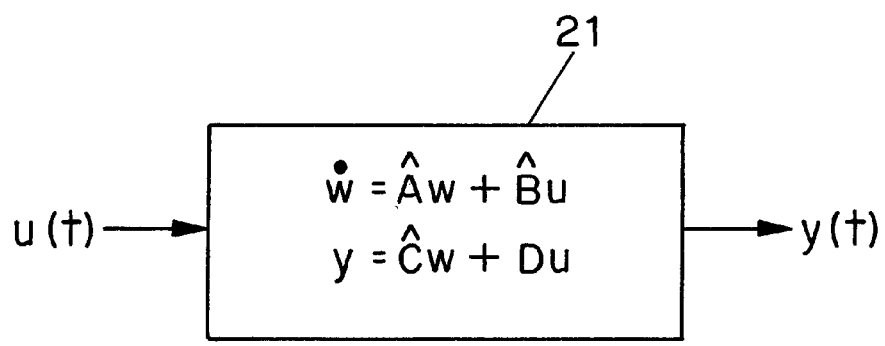
FIG. 2 is a schematic of a companding filter or signal processor circuit made in accordance with a preferred embodiment of the invention.

With the output from the system of FIG. 1, a preferred filter or signal processor circuit 21 with internal companding is schematically shown in FIG. 2. This circuit has the same input-output characteristics as the specified circuit.

Figure 3:
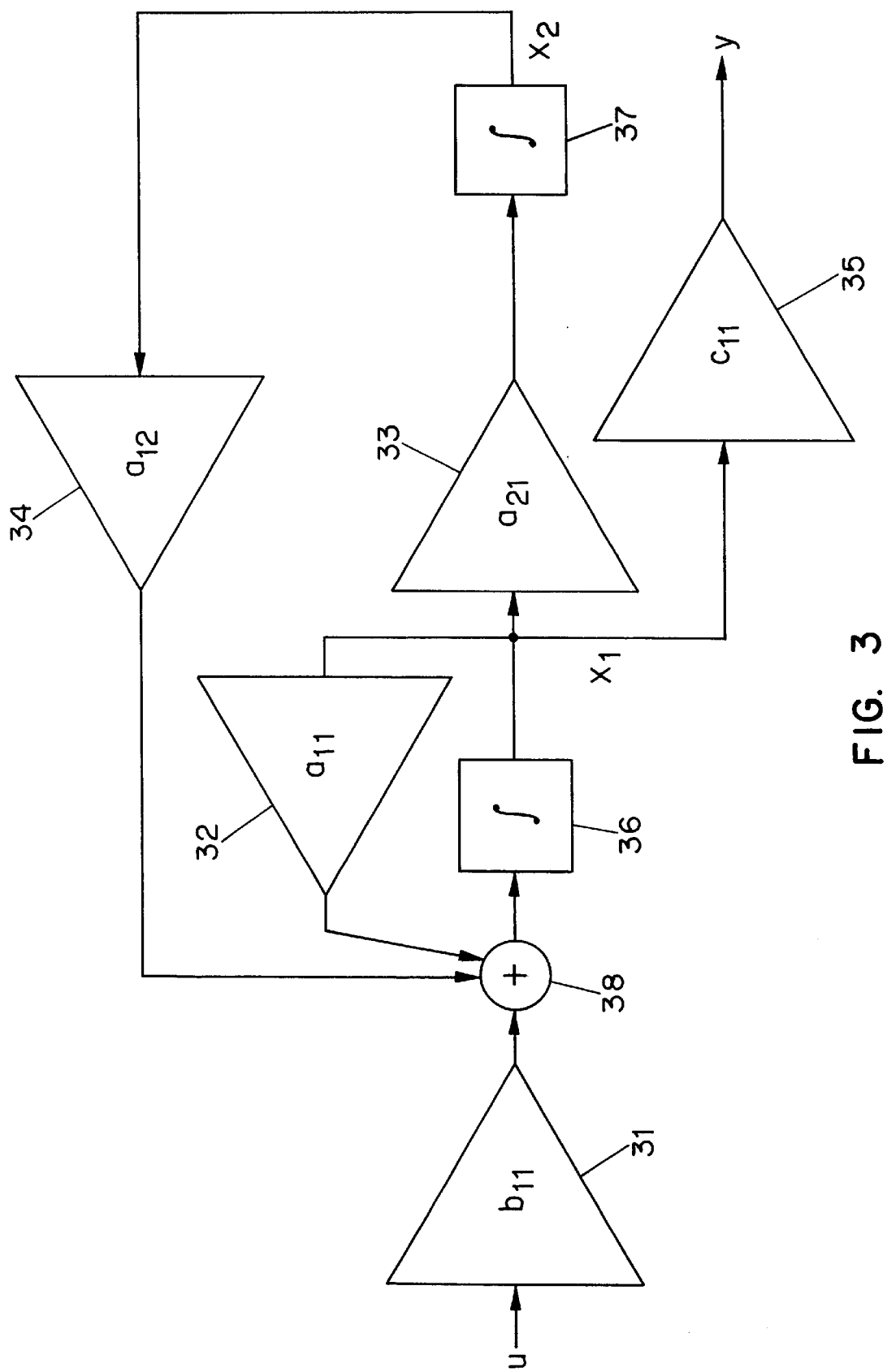
FIG. 3 is a block diagram representing an example of a specified conventional second-order bandpass filter circuit.

FIG. 3 illustrates, as an example, a specified continuous-time second-order bandpass filter circuit with gain elements (e.g., transconductors) 31–35, and with integrators 36 and 37. In FIG. 3, $a_{ij}$ denotes the i-j-th element of the matrix A, and correspondingly for the matrices B and C.

Figure 4:
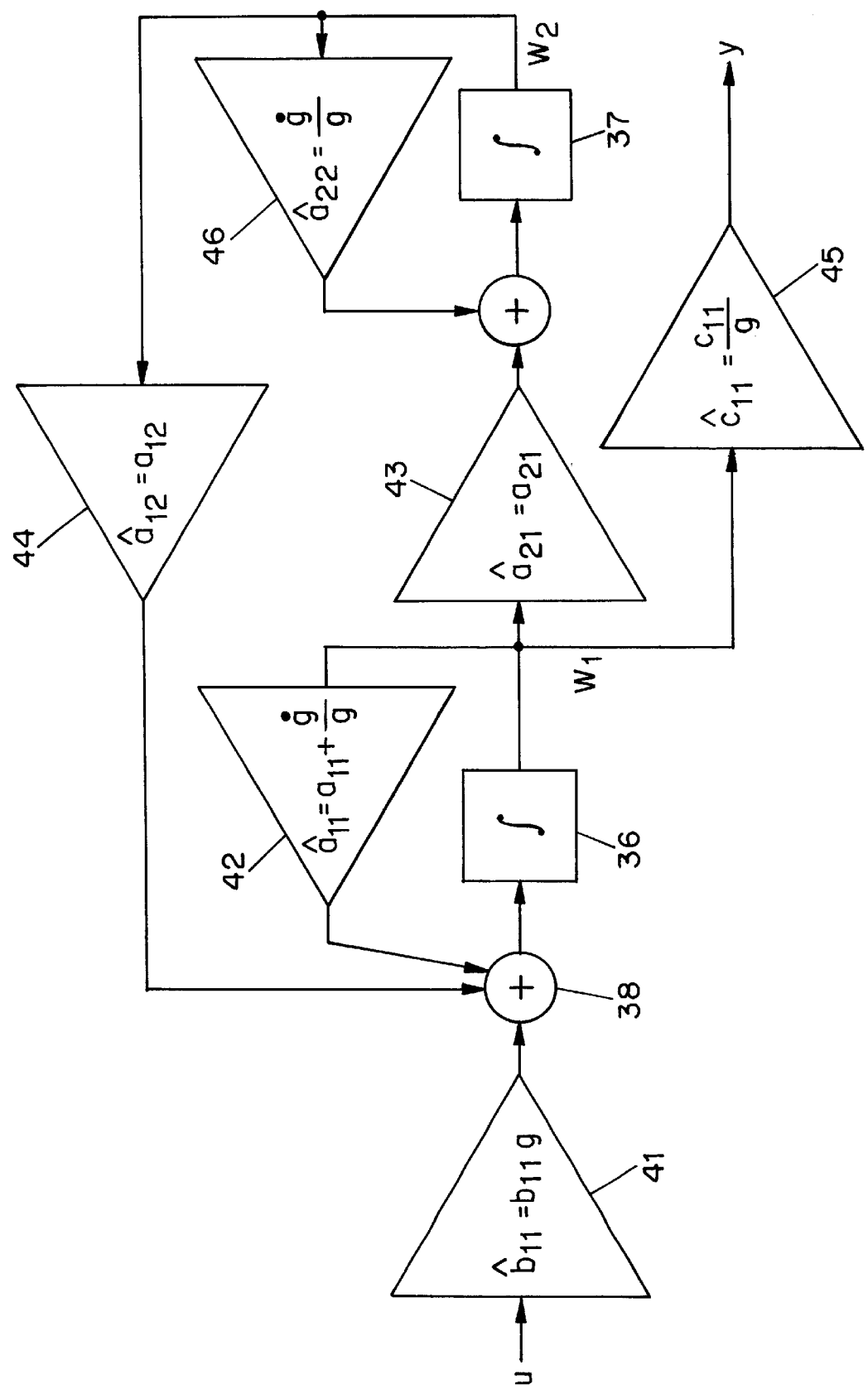
FIG. 4 is a block diagram of a second-order bandpass filter circuit with companding, made in accordance with an example of the invention based on the circuit of FIG. 3.

FIG. 4 shows the circuit of FIG. 3 modified, with gain elements 41–45 and with an additional gain element 46. This additional gain element, as well as the indicated gains of the gain elements 41–45, have been determined as described below, representing an example in accordance with the invention.

With the state variables of the circuit of FIG. 3 denoted by $x_1$ and $x_2$ for an input-output equivalent version with state variables $$w_1(t) = g(t)x_1(t)$$

and $$w_2(t) = g(t)x_2(t),$$

the 2-by-2 matrix G in this example is chosen to have elements $$g_{11} = g_{22} = g$$

and $$g_{12} = g_{21} = 0.$$

With these, the new circuit matrices and $\hat{A}, \hat{B}$ and $\hat{C}$ are obtained with elements as shown in FIG. 4. For syllabic companding, with $$g(t) = 1/(\eta + e_u(t)/\epsilon_0)$$

where $e_u(t)$ is an approximation to the envelope of u(t), $\epsilon_0$ is the envelope level at which zero compression is desired, and $\eta$ is a small number, used to prevent g from becoming infinite when the input is zero, the resulting circuit was simulated with the circuit simulation program Pspice as a current-input, current-output circuit, and with two capacitors as integrators. Voltage input and output could equally be used. An actual differentiator was used in this example to produce $\dot{g}$ from g. The parts containing g in FIG. 4 were implemented with controlled sources. A second-order passive filter was required in the envelope detector, to avoid excessive ripple at the input of the differentiator.

Figure 5A:
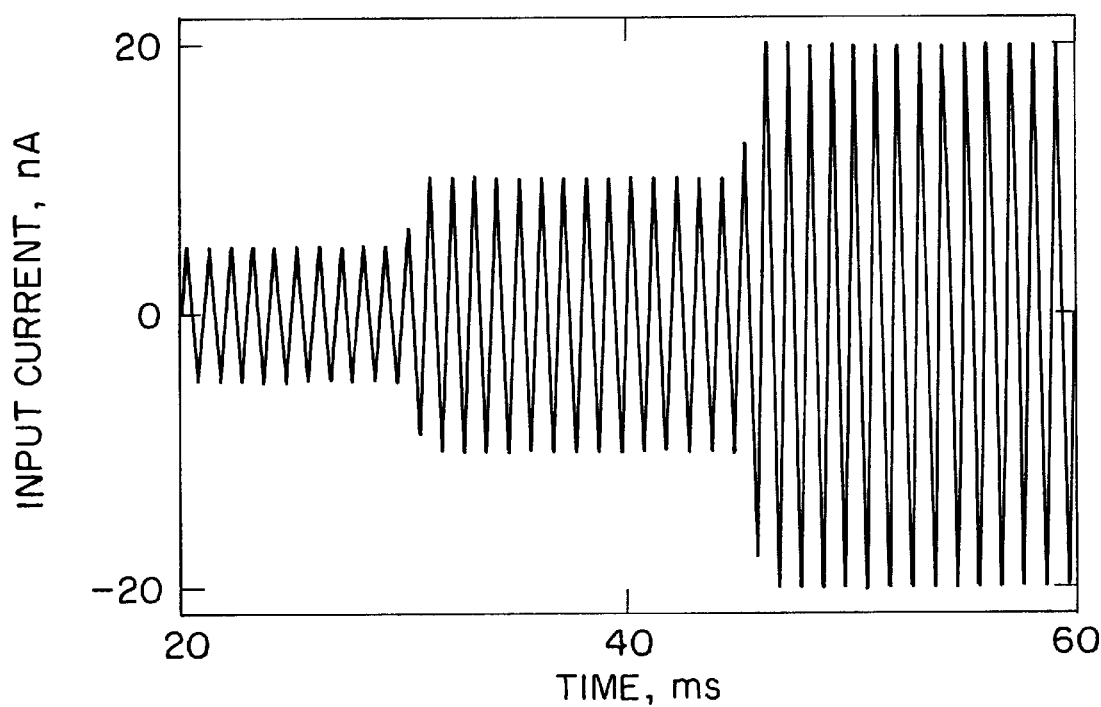
FIGS. 5a–5d are diagrams of waveforms for the companding filter circuit of FIG. 4.
Figure 5B:
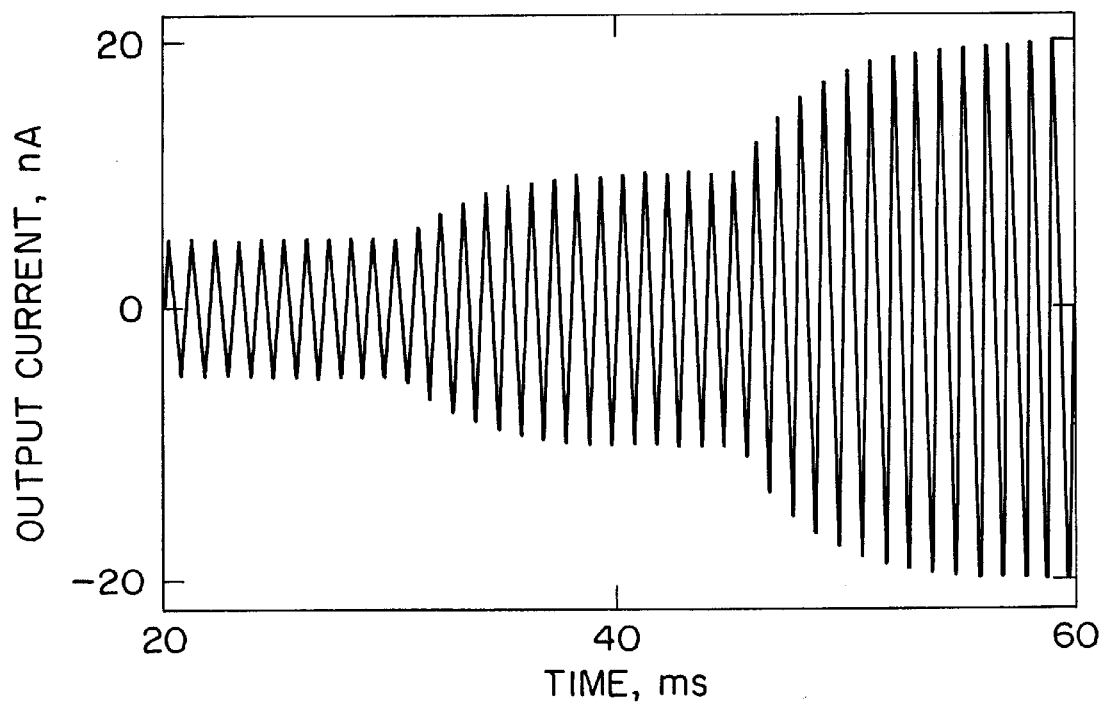

The design was for a center frequency of 1 kHz, a quality factor of 10, and a peak gain of 1. Values $\epsilon_0 = 10$ nA and $\eta = 0.01$ were used. For an input current as shown in FIG. 5a, the output current is shown in FIG. 5b. By comparing this to simulations of the original conventional filter circuit, it has been verified that the output of the two circuits is the same, i.e., there is no envelope distortion introduced by the companding. This would have been impossible if only input and output compressor/expander blocks had been used (e.g., as in items 1. and 2. cited above), since the latter would not take into account the effect of the filter's transfer function on the envelope.

Figure 5C:
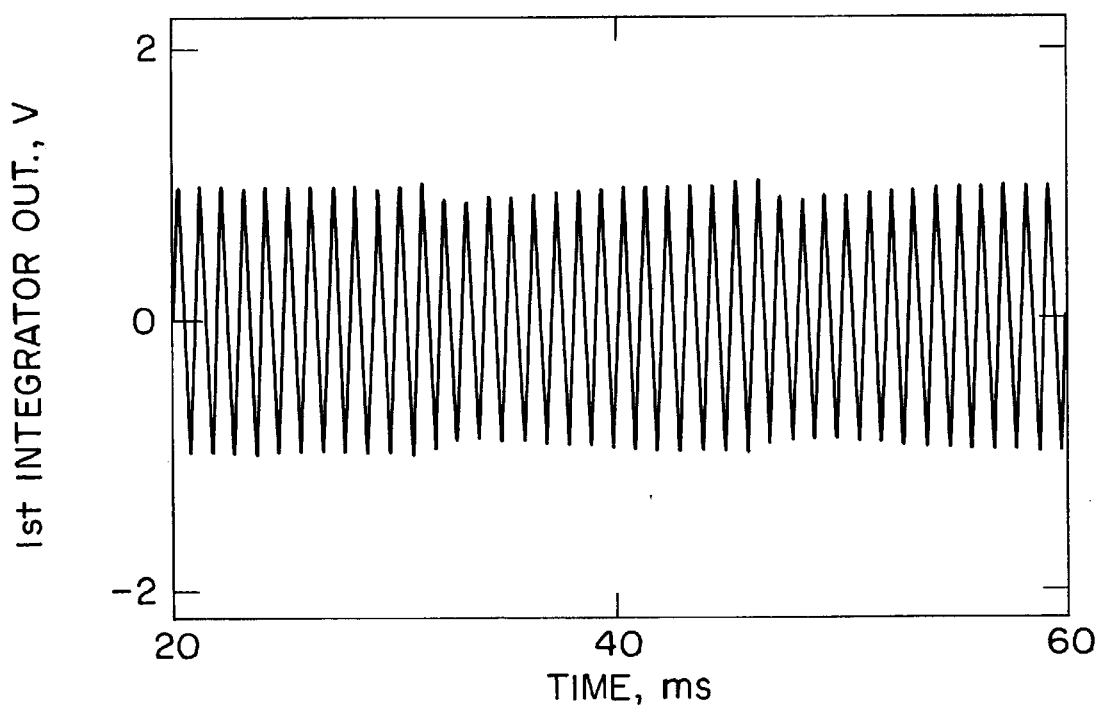
Figure 5D:
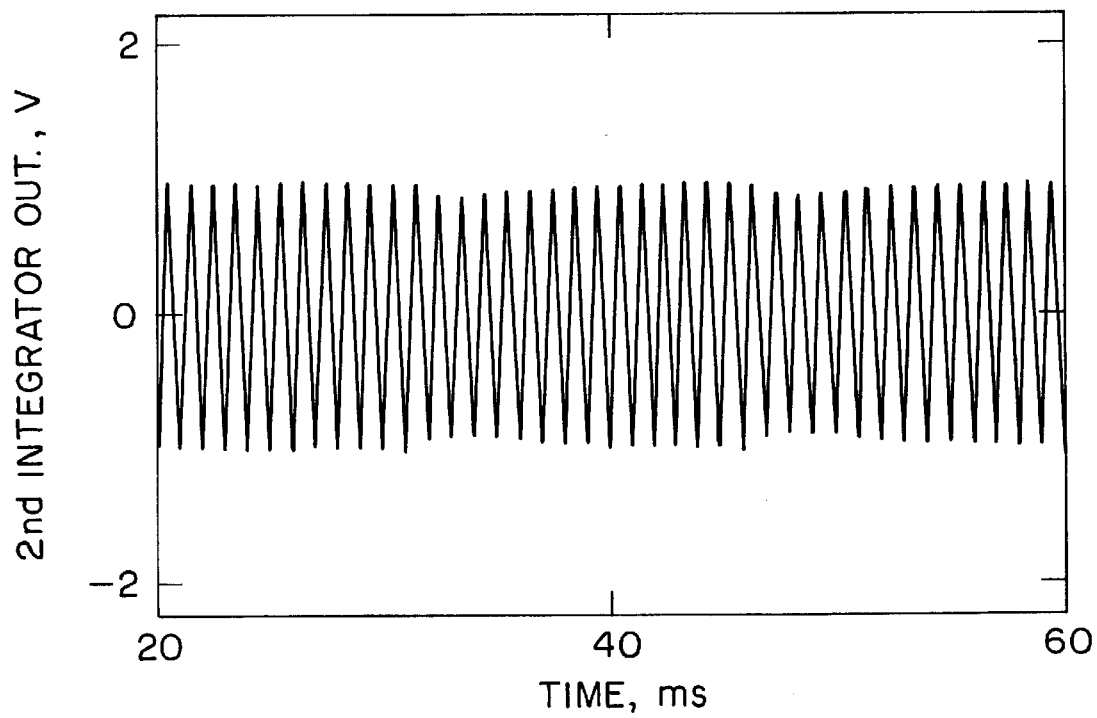

The integrator outputs are shown in FIGS. 5c and 5d. They are properly compressed at a level chosen to be slightly lower than their saturation value. Thus, distortion is prevented while the internal signals stay well above the noise level.

Figure 6A:
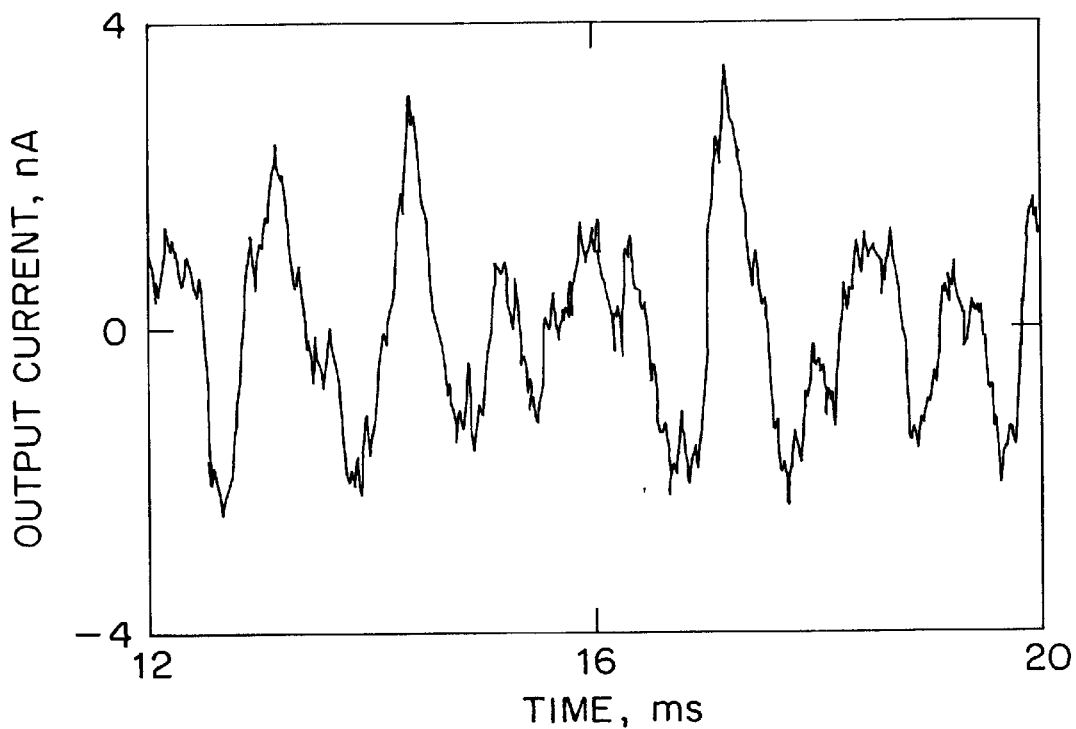
FIGS. 6a and 6b are diagrams of output current as a function of time, for the conventional filter circuit corresponding of FIG. 3, and for the preferred companding filter circuit of FIG. 4, respectively.
Figure 6B:
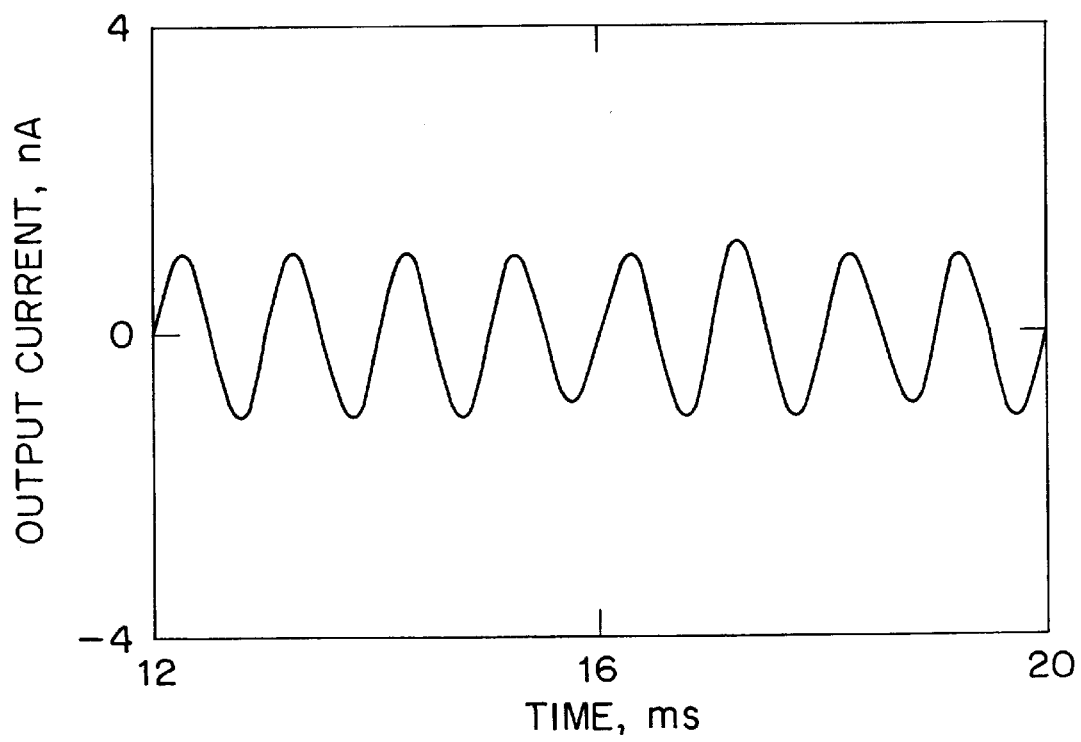

To check the immunity to noise and interference at internal points, pseudo-random noise sources were added in the filter circuit, and transient simulations were carried out to catch the effects of companding. For an input of 1 nA peak, the results are shown in FIG. 6a for the conventional filter circuit and in FIG. 6b for the companding filter circuit. As expected from the definition of g(t) and FIG. 4, the input block amplifies the signal to be processed by approximately 20 dB. The output block attenuates the signal, and thus the noise, by the same amount.

Figure 7:
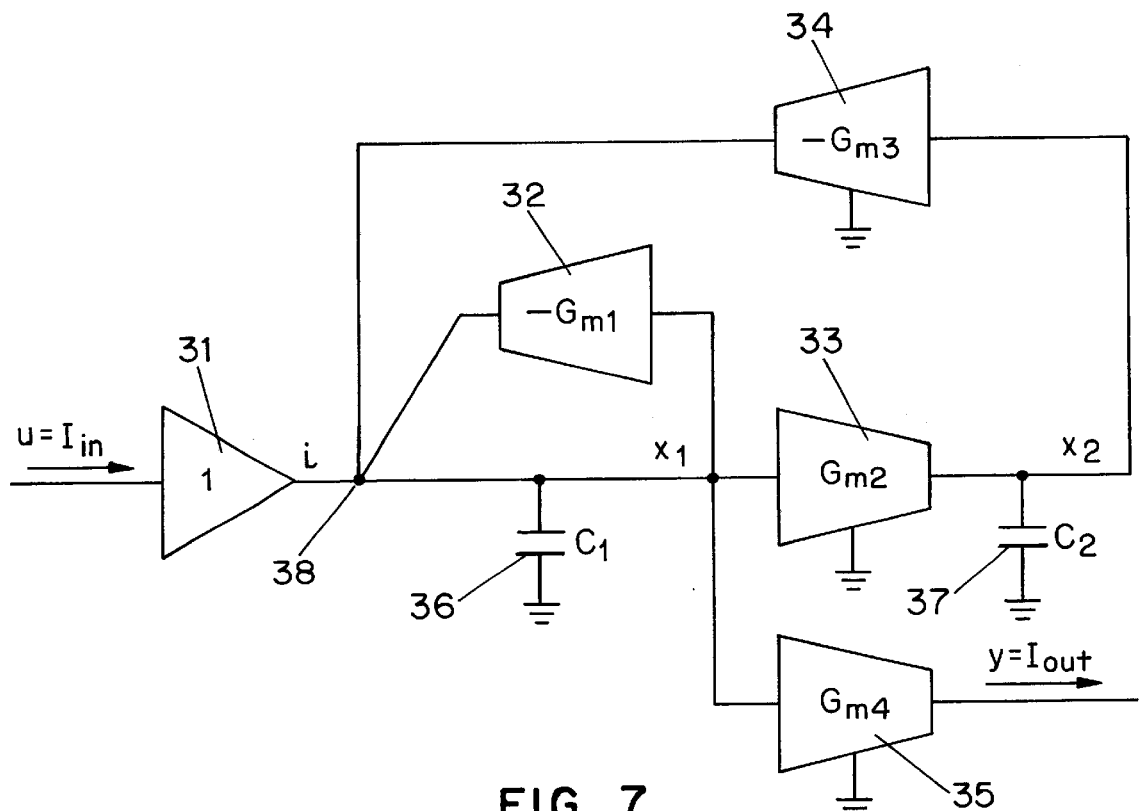
FIG. 7 is a circuit diagram in correspondence with FIG. 3.
Figure 11:
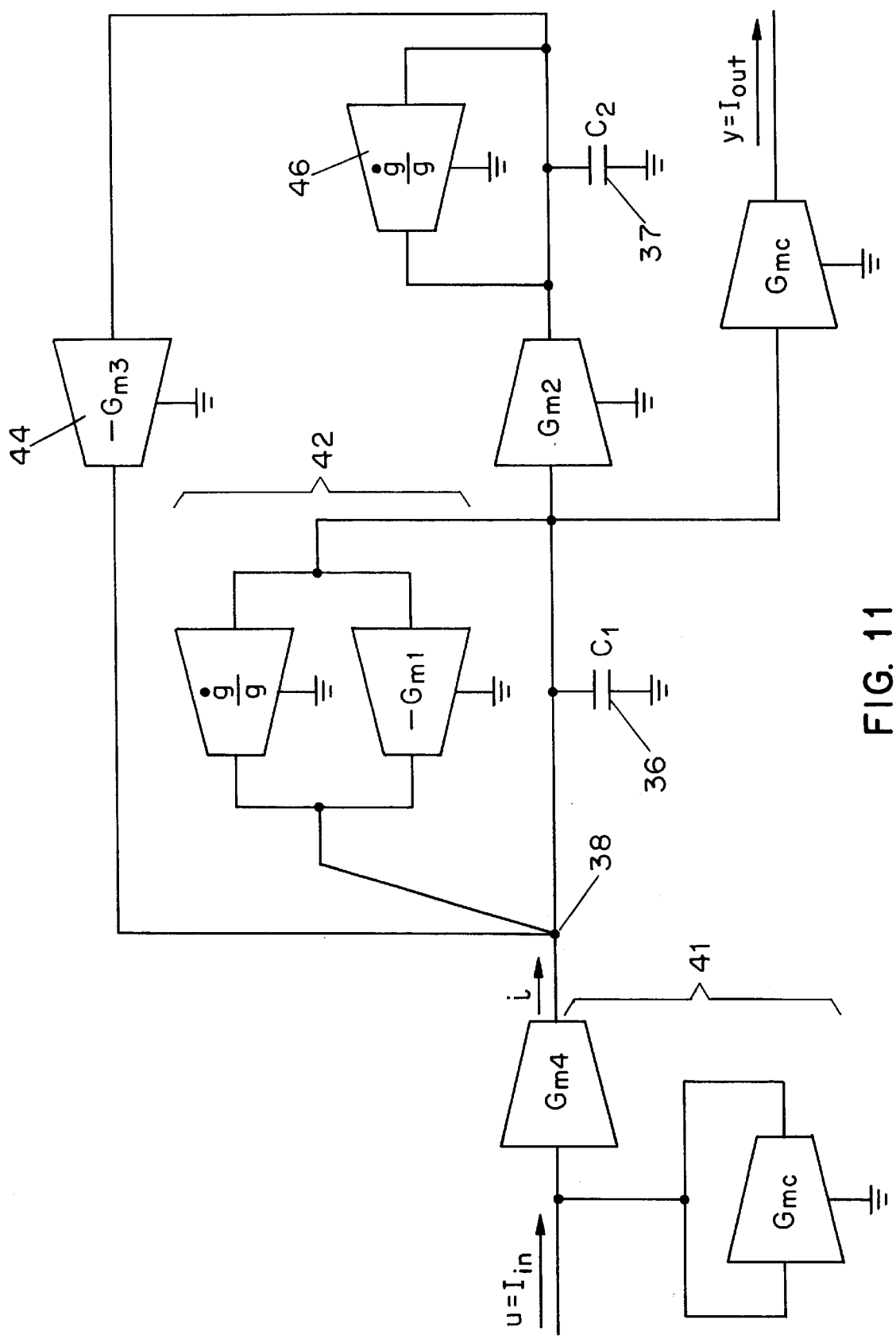
FIG. 11 is an exemplary circuit diagram in correspondence with FIG. 4, including the portions illustrated in FIGS. 8–10.

FIGS. 7 and 11 illustrate more specific implementations in correspondence with FIGS. 3 and 4, respectively. In FIGS. 3, 4, 7 and 11, corresponding elements are designated with the same numerals.

Accordingly, if u and y are currents, and $x_1, x_2, w_1$ and $w_2$ are voltages, the integrators 36 and 37 can be implemented using capacitors, taking a current and developing a voltage corresponding to the integral of the current. The input elements 31 and 41 are for current-in, current out. The elements 32–35 and 42–46 are transconductor circuits, for voltage in, current out. Such circuits can be implemented in various ways as described, e.g., in David Johns et al., *Analog Integrated Circuit Design*, Wiley, N.Y., 1997, or in Y. Tsividis et al., "MOS Transconductors and Integrators with High Linearity", *Electronics Letters*, Vol. 22, No. 5, pp. 245–246, Feb. 27, 1986.

The adder 38 is a node to which currents converge, resulting in their sum to be fed to the integrator 36.

FIG. 3 represents a current-in, current-out filter as known, e.g., from Jaime Ramirez-Angulo et al., "Current-Mode Continuous-Time Filters: Two Design Approaches", *IEEE*

*Transactions on Circuits and Systems II*, Vol. 39, June 1992, pp. 337–341. When implemented as a bandpass filter, using known techniques as described, e.g., in Adel S. Sedra et al., *Microelectronic Circuits*, Oxford University Press, New York, 1998, the circuit of FIG. 7 is obtained, having the following transfer function:

$$I_{out}/I_{in}=G_{m4}C_2s/(C_1C_2s^2+G_{m1}C_2s+G_{m2}G_{m3})$$

where s is the complex frequency variable.

For designing a corresponding companding filter as in FIGS. 4 and 11, if $$g=G_{m4}/G_{mc}$$

where $G_{mc}$ is a transconductance proportional to the envelope of the input current, then $$\hat{b}_{11}=b_{11}g=1 \cdot G_{m4}/G_{mc}.$$

Figure 8:
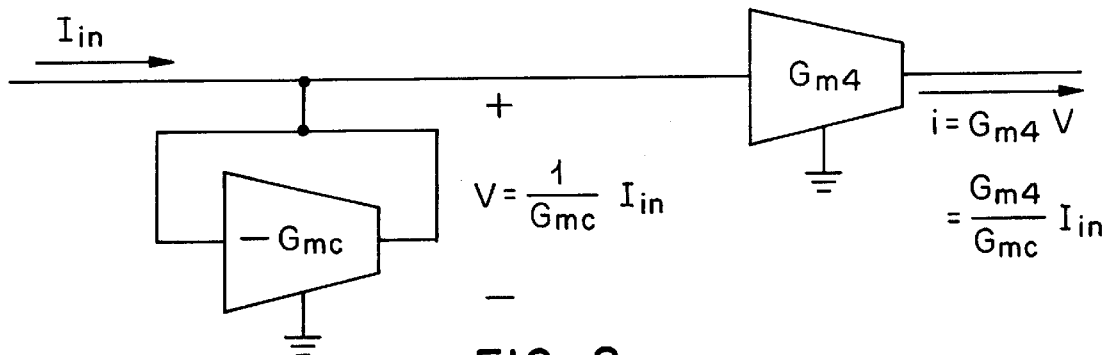
FIGS. 8–10 are exemplary circuit diagrams for portions of a circuit in accordance with a preferred embodiment of the invention

This can be implemented as shown in FIG. 8 where the element $-G_{mc}$, connected with its input and output shorted together as shown, is equivalent to a resistance of value $1/G_{mc}$.

Figure 9:
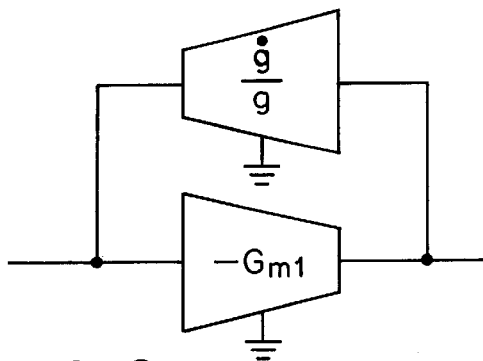
Figure 10:
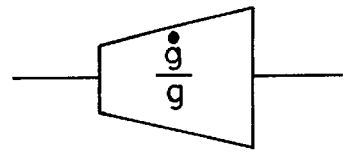

Further with reference to FIGS. 4 and 11, $$\hat{c}_{11}=c_{11}/g=G_{m4}/(G_{m4}/G_{mc})=G_{mc}$$

$$\hat{a}_{11}=a_{11}+\dot{g}/g=-G_{m1}+\dot{g}/g$$

$$\hat{a}_{22}=\dot{g}/g$$

where $a_{11}$ and $a_{22}$, can be obtained from implementations in accordance with FIGS. 9 and 10, respectively. The circuit which derives the quantity $\dot{g}/g$ can be implemented as described in Y. Tsividis et al., "Current-Mode Filters Using Syllabic Companding", *Proceedings, International Symposium on Circuits and Systems*, 1996, pp. 121–124, or in J. Mulder et al. "A Syllabic Companding Translinear Filter", *Proceedings, International Symposium on Circuits and Systems*, 1997, Vol. 1, pp. 101–104.

The circuits of FIGS. 8–10 are incorporated in the circuit of FIG. 11, representing a circuit implementation for FIG. 4 having the same transfer function as the circuit of FIGS. 3 and 7. This is because its input is divided by $G_{mc}$, and the output results after multiplying by $G_{mc}$, so that the two effects cancel out. The $\dot{g}/g$-elements produce a current at their output only when the input signal's envelope is varying, and ensure that the input-output signal behavior of the circuit of FIG. 11 is the same as that of FIG. 7, as described more generally above. The power dissipation of the elements labeled $-G_{mc}$ and $G_{mc}$ is roughly proportional to their transconductance $G_{mc}$ which, as described above, is proportional to the envelope of the input signal current. Thus, the power dissipation of these elements is large only when the input signal current is large.

As compared with FIGS. 3 and 7, the circuit of FIGS. 4 and 11 can be appreciated as using signal-driven dynamic biasing, drawing supply power only as needed for a desired signal-to-noise ratio over a useable dynamic range. Since $-G_{mc}$ is proportional to the input envelope, the envelope of the voltage across the input element $-G_{mc}$ is constant. Thus, this envelope can be maintained to be large enough to be well above noise and interference, yet small enough to prevent distortion. As a result, the complete circuit of FIG. 11 can maintain a large value for the ratio of signal to noise-plus-distortion, for a large range of input signal envelopes. This is in contrast to the conventional circuit of FIG. 7. Although the input-output signal behavior of the circuits of FIGS. 7 and 11 is the same, the circuit of FIG. 11 has the advantage of maintaining the output noise and distortion low for a large range of input signals, and it draws power dissipation only to the extend necessary to achieve this.

In a preferred method, for known matrices A, B and C for an original filter or signal processor circuit, the elements $g_{ij}$ of the matrix G are determined heuristically or methodically for companding. With the matrix G thus defined, the matrices $\hat{A}, \hat{B}$ and $\hat{C}$ are determined, for physical implementation of an input-output equivalent circuit based on the latter matrices. Conveniently, these determinations can be carried out by a suitably programmed computer.

The method described can be applied to any filter or signal processor circuit topology which can be described by state equations, including, e.g., the popular "leap-frog" topology. The matrix G can be chosen to depend on instantaneous signal values for instantaneous companding, on average signal strength as in AGC circuits for syllabic companding, or on both. G can be produced from input, output or internal signals (or a combination thereof) of a specified filter or signal processor circuit, or of a companion circuit (e.g., a replica of the specified circuit with scaled signals). Such options apply correspondingly to discrete-time circuits, e.g., switched-capacitor circuits.

A resulting equivalent filter or signal processor circuit can be implemented by known methods, e.g., in the form of a dedicated circuit on a single chip or as a discrete-component circuit. Implementation of the equivalent circuit as a digital signal processor or a suitably programmed computer is not precluded.

While the described techniques are applicable especially to analog or digital electronic signal processing circuits, and are less applicable in the over-all design of recording and playback, storage and retrieval, or transmission and reception systems, the techniques still may be used to advantage in subsystems of such systems. Particularly significant uses of companding filter circuits or signal processors are in portable telephones, radios and TV sets, in hearing aids, computer disk drives, and computer communications networks, for example. Such circuits are especially useful in battery-operated equipment, for reducing noise without undue power dissipation.

What is claimed is:

1. A linear, continuous-time electrical signal processor having input-output characteristics as prescribed for a time varying signal input vector u(t) and a time-varying signal output vector y(t) specified for a state vector x(t) of state variables by equations $$\dot{x}=Ax+Bu$$

and $$y=Cx+Du$$

wherein A, B, C, and D are prescribed matrices, having a signal input means for the input vector u(t) and a signal output means for the output vector y(t), and being prescribed for a state vector w(t) of state variables by equations $$\dot{w}=\hat{A}w+\hat{B}u$$

and $$y=\hat{C}w+Du$$

wherein $$\hat{A}=\dot{G}G^{-1}+GAG^{-1}, \hat{B}=GB$$

and $$\hat{C}=CG^{-1}$$

with G(t) being preselected such that the state vector is w(t) is companded as compared with the state vector x(t).

2. The signal processor of claim 1, wherein the matrix G is preselected for instantaneous companding.

3. The signal processor of claim 1, wherein the matrix G is preselected for syllabic compandig.

4. The signal processor of claim 3, comprising a first and a second transconductor element for implementing a value $b_{11}$ for the (1, 1)-element of the matrix B, and a third transconductor element for implementing a value $c_{11}$ for the (1, 1)-element of the matrix C, wherein:

the first transconductor element is connected with its input at a signal input terminal of the signal processor and its output at an adder node of the signal processor, the second transconductor element has a negative transconductance and is connected at the input terminal of the signal processor with both transconductor input and output terminals, and the third transconductor element is connected for producing an output signal current from the signal processor and has a positive transconductance of the same magnitude as the second transconductor element.

5. The signal processor of claim 3, comprising a first and a second transconductor element for implementing a value $b_{11}$ for the (1, 1)-element of the matrix B, and a third transconductor element for implementing a value $c_{11}$ for the (1, 1)-element of the matrix C, wherein the first transconductor element is connected with its input at a signal input terminal of the signal processor and its output at an adder node of the signal processor, the second transconductor element has a negative transconductance and is connected at the input terminal of the signal processor with both transconductor input and output terminals, and the third transconductor element is connected for producing an output signal current from the signal processor and has a positive transconductance of a magnitude which is proportional with a fixed constant of proportionality to the second transconductor element.

6. The signal processor circuit of claim 4 or 5, wherein, for companding, the second and third transconductor elements have transconductances which depend on signal level.

7. The signal processor circuit of claim 6, wherein the transconductances of the second and third transconductor elements are substantially proportional to an input signal current envelope.

8. A linear, discrete-time electrical signal processor having input-output characteristics as prescribed for a time-varying input vector u(n) and a time-varying signal output vector y(n) specified for a state vector x(n) of state variables by equations $$x(n+1)=Ax(n)+Bu(n)$$

and $$y(n)=Cx(n)+Du(n)$$

wherein A, B, C and D are prescribed matrices, having a signal input means for the input vector u(n), and a signal output means for the signal output vector y(n), and being prescribed for a state vector w(n) of state variables by equations $$w(n+1)=\hat{A}w(n)+\hat{B}u(n)$$

and $$y(n)=\hat{C}w(n)+Du(n)$$

wherein $$\hat{A}=G(n+1)AG^{-1}(n),\ \hat{B}=G(n+1)B$$

and $$\hat{C}+CG^{-1}(n)$$

with G(n) being preselected such that the state vector w(n) is companded as compared with the state vector x(n).

9. The signal processor of claim 8, wherein the matrix G is preselected for instantaneous companding.

10. The signal processor of claim 8, wherein the matrix G is preselected for syllabic companding.

* * * * *

UNITED STATES PATENT AND TRADEMARK OFFICE
CERTIFICATE OF CORRECTION

PATENT NO.     : 6,389,445 B1
DATED          : May 14, 2002
INVENTOR(S)    : Tsividis, Yannis It is certified that error appears in the above-identified patent and that said Letters Patent is hereby corrected as shown below:

Column 2,
Line 64, "DRAWING" should read -- DRAWINGS --

Column 5,

Line 26, "$\hat{\alpha}_{11}$" should read -- $\hat{a}_{11}$ --; and "$\alpha$" should read -- a --

Line 27, "$\hat{\alpha}_{22}$" should read -- $\hat{a}_{22}$ --

Column 6,
Line 3, "extend" should read -- extent --
Line 44, "time" should read -- time- --

Column 7,
Line 4, "is" should be deleted
Line 9, "compandig." should read -- companding. --

Column 8,
Line 35, "$\hat{C}+CG^{-1}(n)$" should read -- $\hat{C}=CG^{-1}(n)$ --

Signed and Sealed this

Sixteenth Day of March, 2004

JON W. DUDAS
*Acting Director of the United States Patent and Trademark Office*